(12) United States Patent
Sesti et al.

(10) Patent No.: US 10,635,914 B2
(45) Date of Patent: Apr. 28, 2020

(54) OPTICAL TEST DEVICE FOR A VEHICLE CAMERA AND TESTING METHOD

(71) Applicant: MAGNA ELECTRONICS INC., Auburn Hills, MI (US)

(72) Inventors: Matthew C. Sesti, Williamston, MI (US); David F. Olson, Lapeer, MI (US); Robert A. Devota, Durand, MI (US); John R. Garcia, Montrose, MI (US); Donald W. Mersino, Montrose, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/014,590

(22) Filed: Jun. 21, 2018

(65) Prior Publication Data

US 2018/0373944 A1    Dec. 27, 2018

Related U.S. Application Data

(60) Provisional application No. 62/523,961, filed on Jun. 23, 2017.

(51) Int. Cl.
| | |
|---|---|
| *H04N 7/00* | (2011.01) |
| *H04N 7/18* | (2006.01) |
| *G06K 9/00* | (2006.01) |
| *G06K 9/32* | (2006.01) |
| *H04N 5/232* | (2006.01) |
| *B60R 1/00* | (2006.01) |
| *G02B 27/00* | (2006.01) |
| *H04N 17/00* | (2006.01) |
| *H04N 9/10* | (2006.01) |
| *B60R 1/12* | (2006.01) |

(52) U.S. Cl.
CPC ............ *G06K 9/00805* (2013.01); *B60R 1/00* (2013.01); *G02B 27/00* (2013.01); *G06K 9/3241* (2013.01); *H04N 5/23212* (2013.01); *H04N 5/23229* (2013.01); *H04N 5/23238* (2013.01); *H04N 17/002* (2013.01); *B60R 2001/1253* (2013.01); *B60R 2300/402* (2013.01)

(58) Field of Classification Search
USPC ...... 348/118, 61, 68, 73, 131, 140, 143, 144
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Daquan Zhao
(74) *Attorney, Agent, or Firm* — Honigman LLP

(57) ABSTRACT

A system for testing a camera for vision system for a vehicle includes providing a camera having a field of view and providing and disposing a test structure in the field of view of the camera and between the camera and a target. The test structure includes at least one optic and is capable of directing a principal axis of the at least one optic toward multiple respective regions of the target. The camera views the target via the at least one optic. Image data is captured with the camera. The captured image data is representative of images of the target including the multiple regions of the target as captured when the at least one optic has its principal axis directed toward the respective regions of the target. The image data captured by the camera is processed to determine the focus at each of the multiple regions of the target.

14 Claims, 10 Drawing Sheets

(56) References Cited

U.S. PATENT DOCUMENTS

| | | |
|---|---|---|
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 2005/0089208 A1* | 4/2005 | Dong .................. G02B 21/241 382/133 |
| 2007/0211240 A1* | 9/2007 | Matsumoto ........ G01N 21/8851 356/237.1 |
| 2017/0006282 A1 | 1/2017 | Sigle |
| 2017/0234923 A1 | 8/2017 | Douglas et al. |
| 2018/0302615 A1 | 10/2018 | Lehmann et al. |

\* cited by examiner

Multi Optic system aligns optic axis to off axis target location

OPTICAL TEST DEVICE FOR A VEHICLE CAMERA AND TESTING METHOD

CROSS REFERENCE TO RELATED APPLICATION

The present application claims the filing benefits of U.S. provisional application Ser. No. 62/523,961, Jun. 23, 2017, which is hereby incorporated herein by reference in its entirety.

FIELD OF THE INVENTION

The present invention relates generally to cameras for a vehicle and, more particularly, to a system for testing focus capabilities of a camera for a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Current testing of cameras (typically far field cameras) requires cameras to be tested at 8 meters or greater to check the focus of a camera at a distance that is representative of how the camera will function in a vehicle during normal driving conditions for the camera to function as designed. To test a camera at 8 meters or greater is difficult due to the size needed to test cameras at that distance. Many camera test and build facilities use a single intermediate optic system (see FIG. 2) to allow cameras to be tested at a closer distance. This intermediate optic makes it possible to test cameras in a more reasonable distance while still simulating the 8 meter distance.

The single intermediate optic does a good job correlating the center focus target (see FIG. 3, where this was measured at 99.2 percent), but the off axis targets (corner targets) correlation is not as good as the center focus (measured 79.5 percent, 89.1 percent, 77.1 percent, and 82.2 percent in the off axis four corners). This inconsistency in the off axis target focus can produce inconsistent data points in the off axis locations (corner targets).

SUMMARY OF THE INVENTION

The present invention provides a testing system for testing the focus capability of a camera for a driving assistance system or vision system or imaging system for a vehicle. The testing system or method includes a multi-optic test structure that is disposed in the field of view of a to-be-tested camera and between the camera and a target. The multi-optic test structure comprises a plurality of optics, each having a principal axis directed toward a respective region of the target. Image data is captured by the camera and processed (via an image processor) to determine the focus at each region of the target.

The multi-optic test structure preferably comprises five optics, including a center optic, an upper left corner optic, a lower left corner optic, an upper right corner optic, and a lower right corner optic. The center optic has its principal axis normal to an imager of the camera and normal to the target. Each of the corner optics is angled so that its principal axis is directed toward a respective corner region of the target.

The system and method of the present invention may include a single optic test structure that has an adjustable single optic, whereby the optic may be adjusted between multiple (e.g., five) angular orientations relative to the imager of the camera and the target. For example, the optic may be adjustable between a center orientation, where its principal axis is normal to the target and imager, an upper left corner orientation, wherein its principal axis is directed toward an upper left corner region of the target, an upper right corner orientation, wherein its principal axis is directed toward an upper right corner region of the target, a lower right corner orientation, wherein its principal axis is directed toward a lower right corner region of the target, and a lower left corner orientation, wherein its principal axis is directed toward a lower left corner region of the target.

The multi-optic test structure or the adjustable optic test structure is usable in a testing process or method to determine the focus or accuracy of manufactured cameras (before they are installed on vehicles). The test structure provides enhanced testing capabilities and at reduced size test facilities, since the distance between the camera and the target may only be 465 mm (to represent an effective distance of 8 meters between the camera and target).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
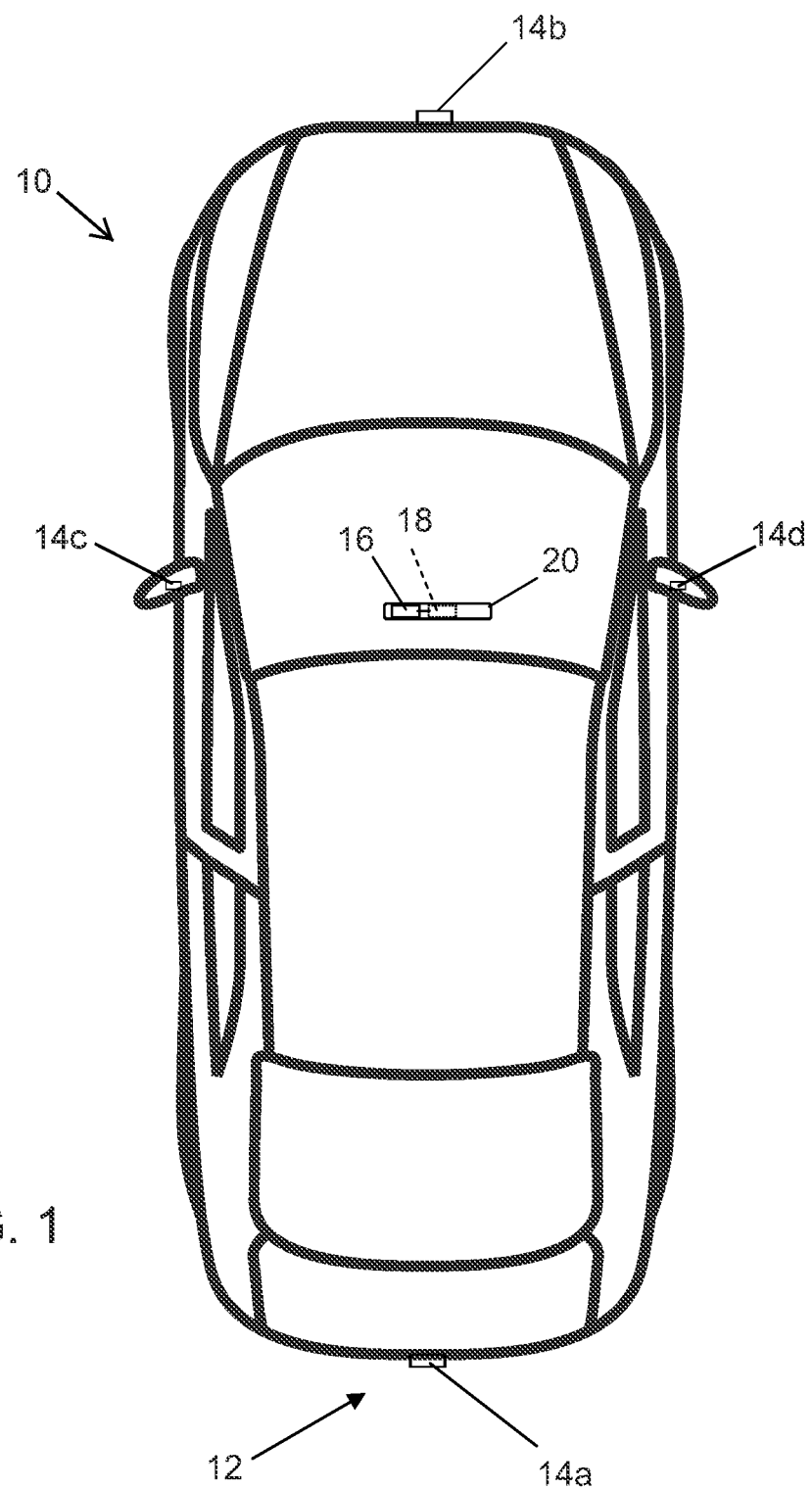
FIG. 1 is a plan view of a vehicle with a vision system that incorporates cameras in accordance with the present invention.
Figure 2:
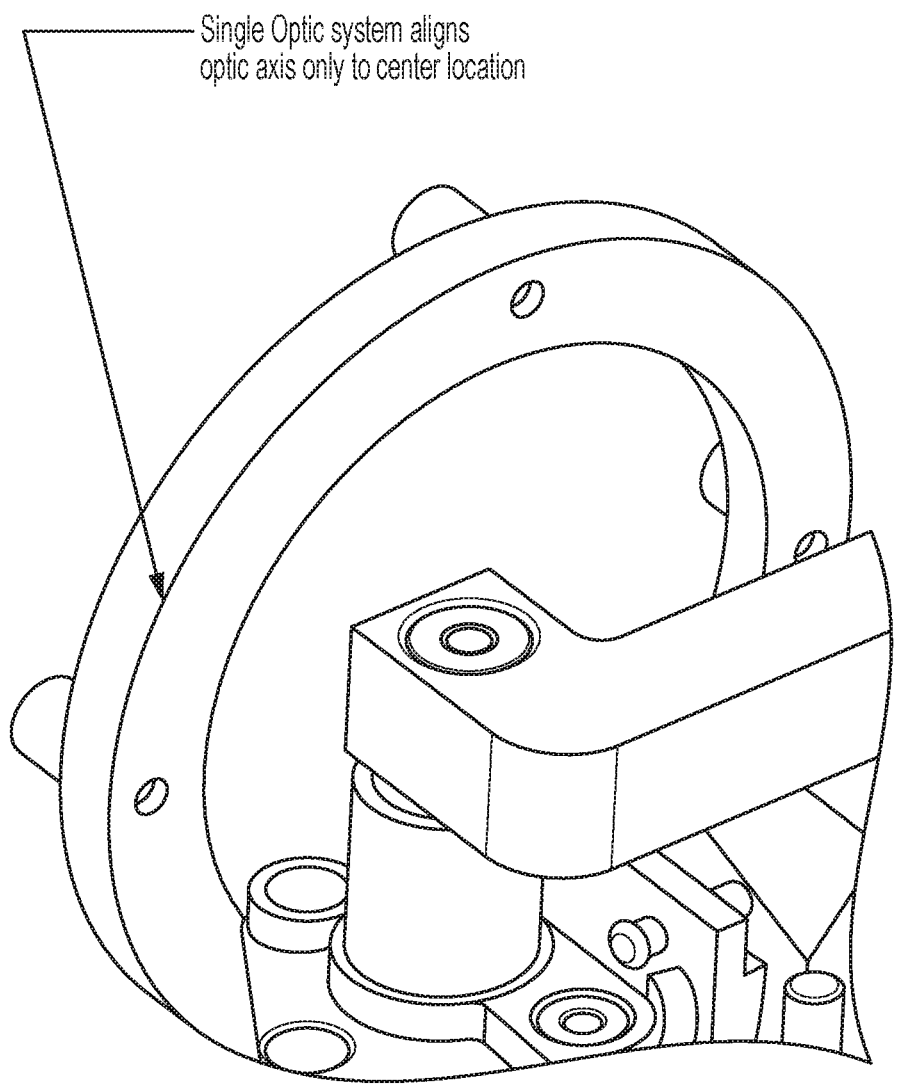
FIG. 2 shows a prior art single optic test structure, with the single intermediate optic aligned with the center of the target.
Figure 3:
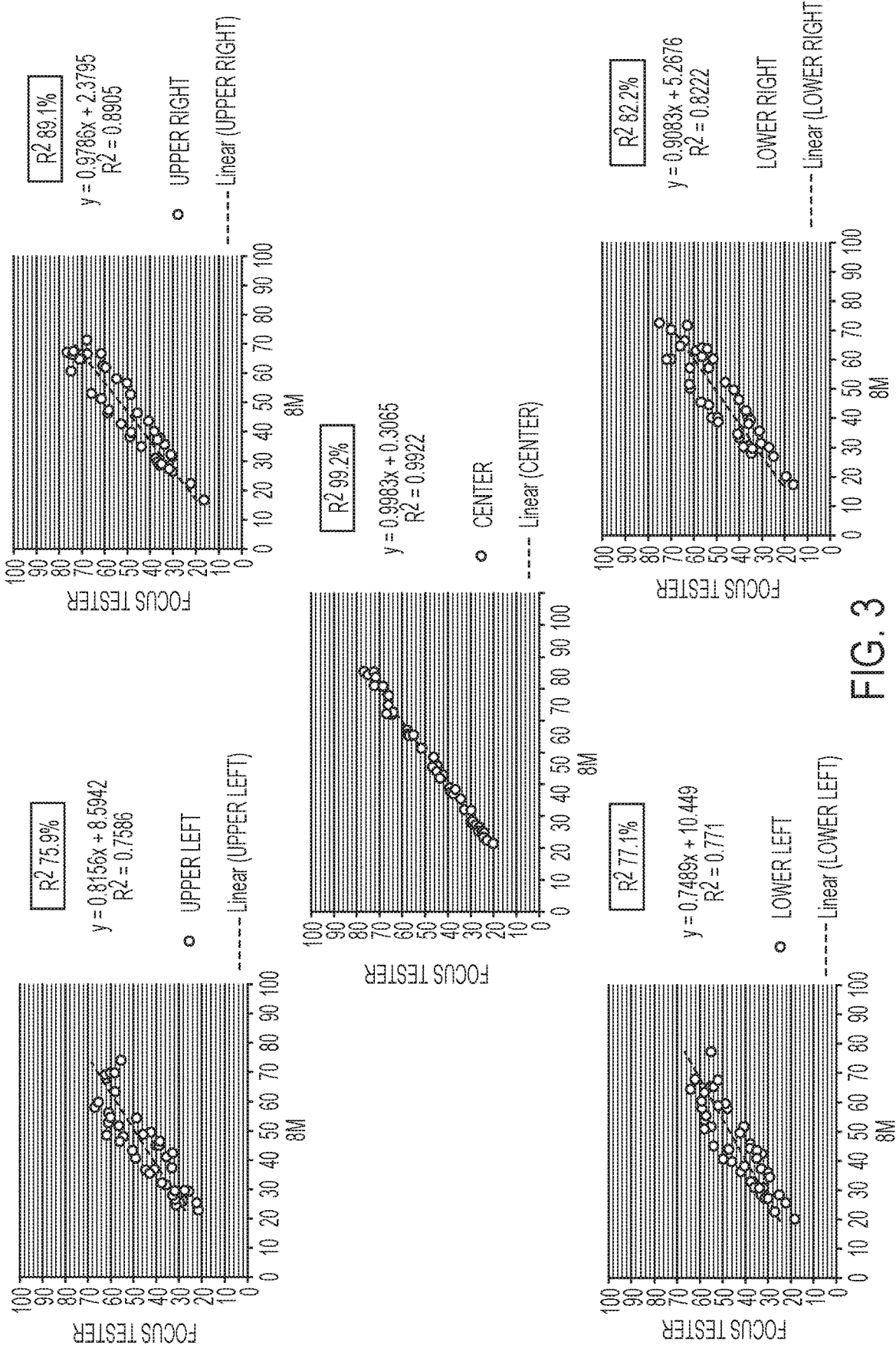
FIG. 3 shows test results using the single intermediate optic of FIG. 2.
Figure 4:
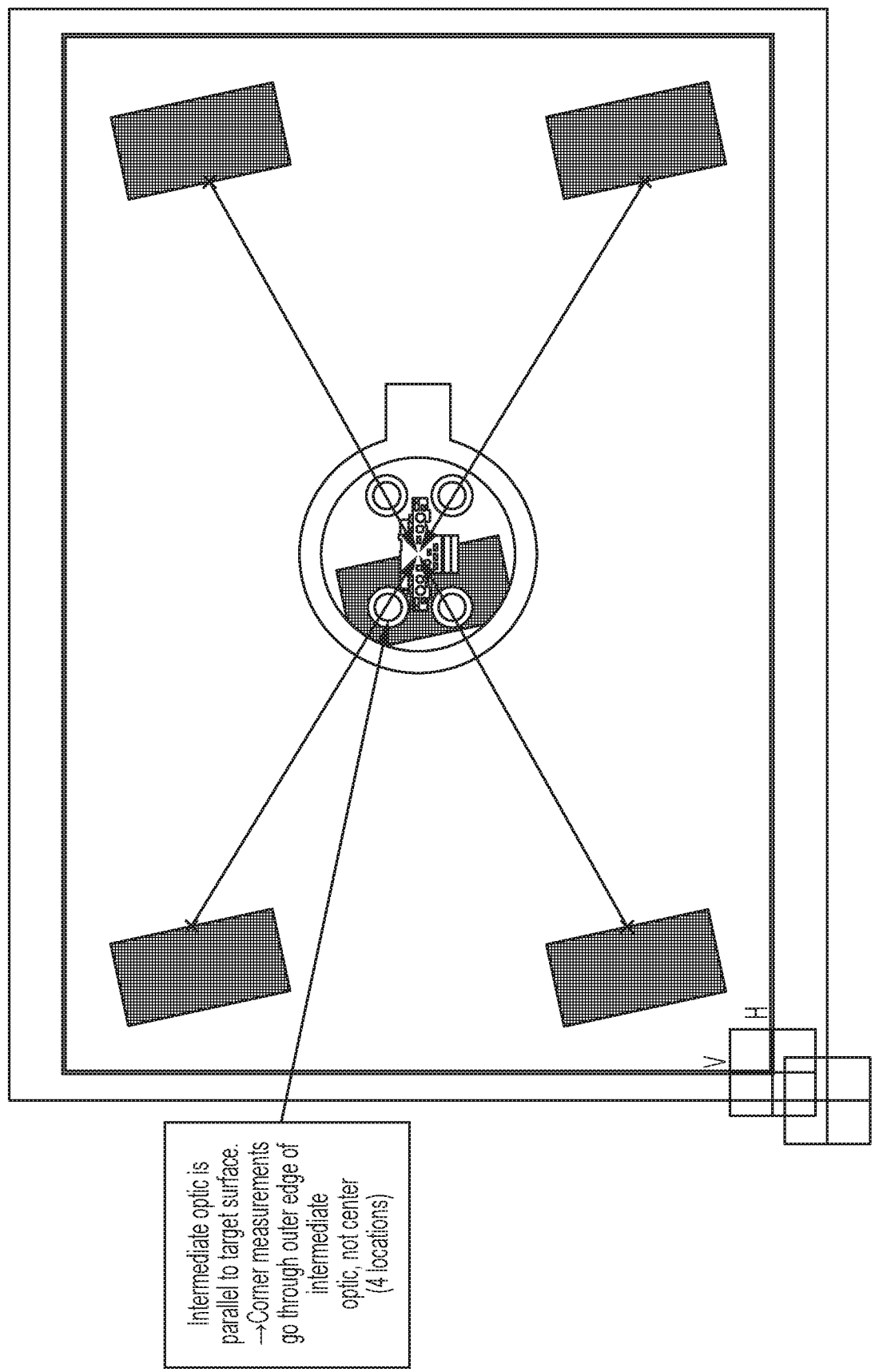
FIG. 4 shows use of an adjustable intermediate optic that is adjustable to align with respective ones of the center region and corner regions of the target.
Figure 6:
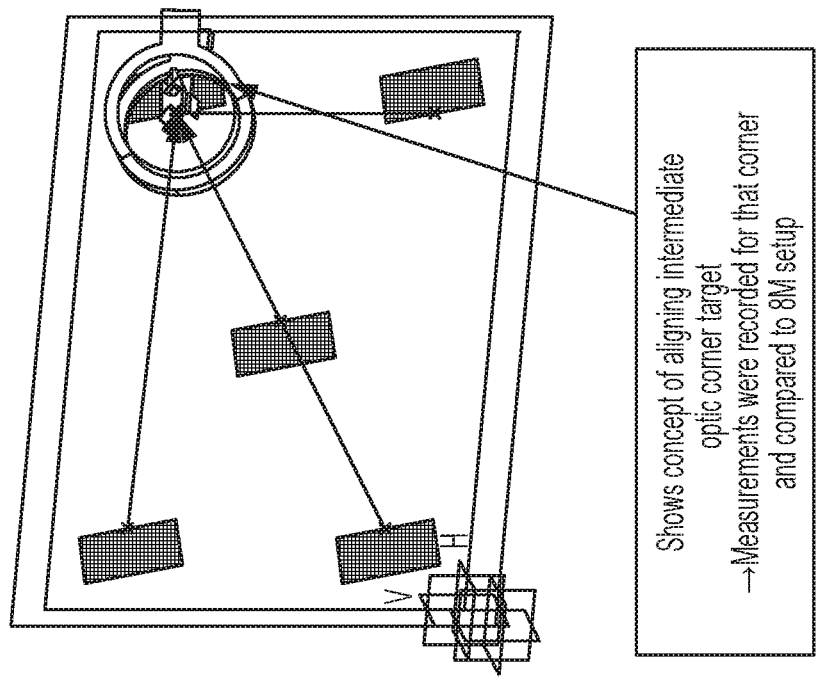
FIGS. 5-7 are images showing the adjustable intermediate optic and the camera and target.
Figure 5:
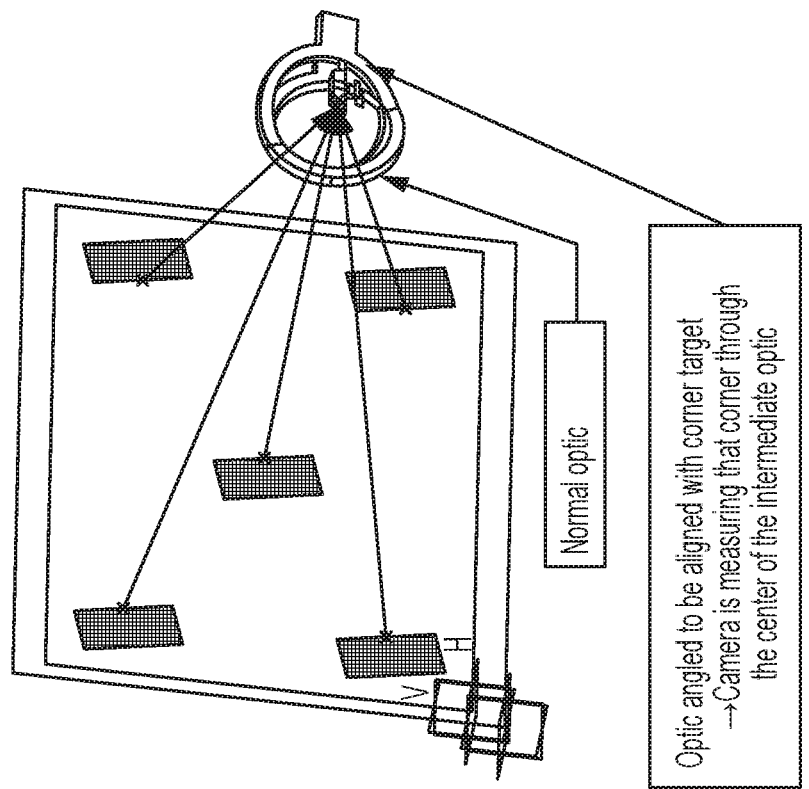
Figure 7:
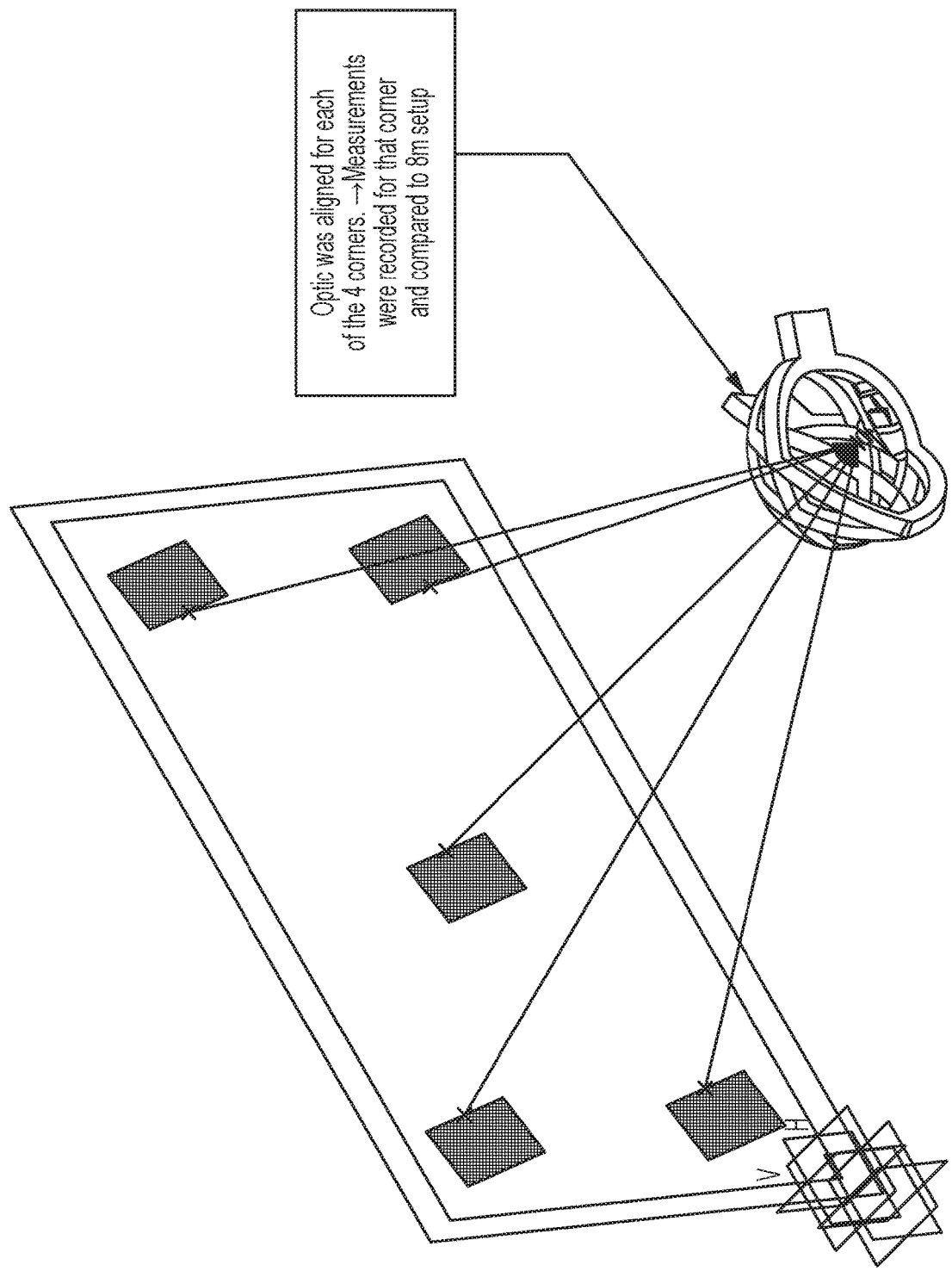

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens (such as a wide angle fish-eye lens that provides sharper focus at the center of the field of view and increased distortion at the periphery of the field of view) for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 8:
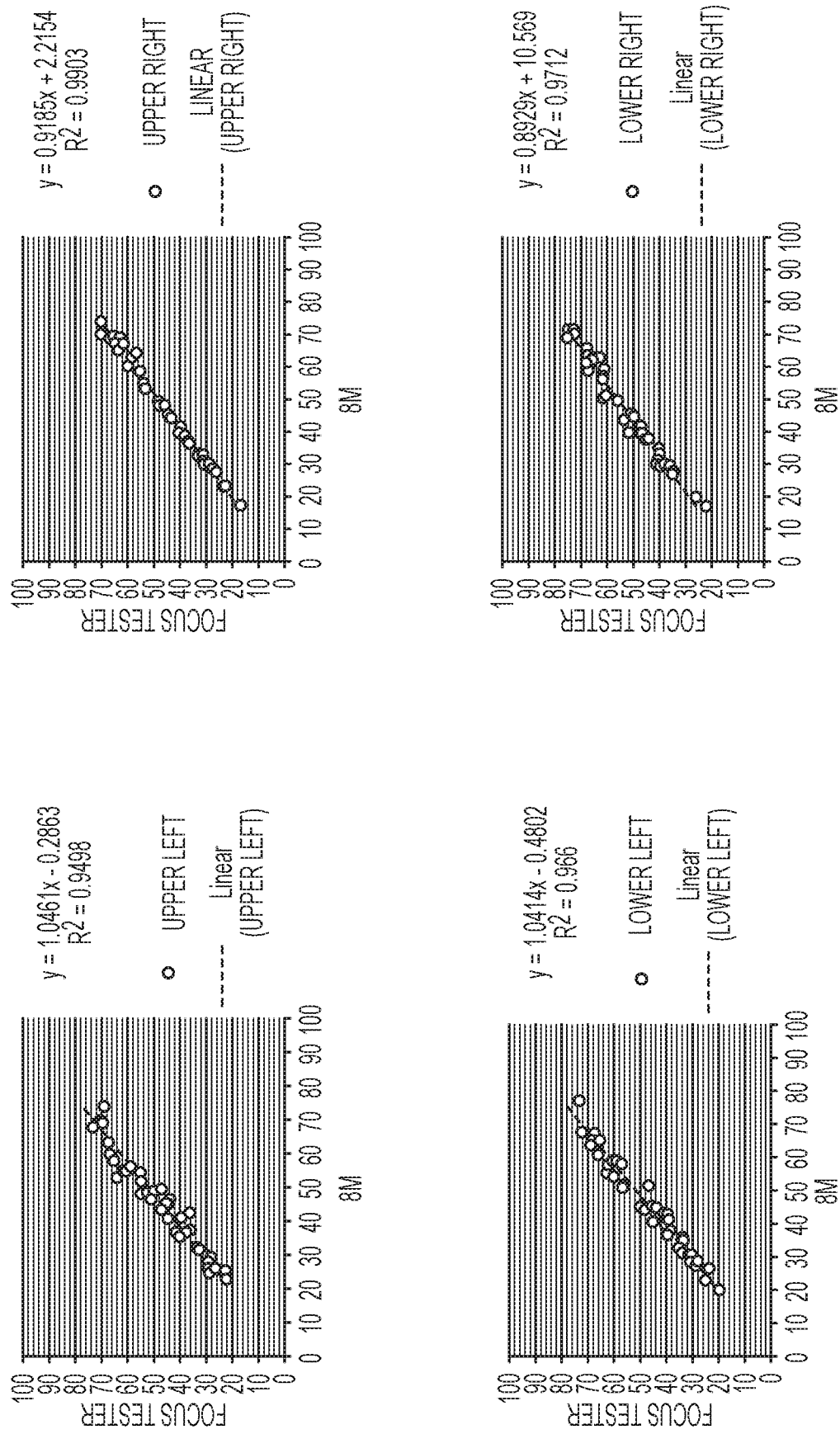
FIG. 8 shows test results using the adjustable intermediate optic of FIGS. 4-7.

To help achieve a better correlation to the off axis focus target, an optional approach may, instead of using a single intermediate optic, use an angled or adjustable optic that can be angled relative to the camera to focus at the center target and each of the off axis targets, such as shown in FIGS. 4-8. As shown in FIG. 8, this approach provides enhanced focus at the corner target regions.

To help achieve an even better correlation to the off axis focus target, the present invention, instead of using a single intermediate optic, uses a multiple optic system (FIG. 9A-D) that allows each optic to be directly pointed at the off axis target. This concept has increased the off axis correlation significantly (see FIG. 10, measured at 96.9 percent, 98.4 percent, 95.7 percent, and 97.9 percent, respectively, to single optic off axis four corners) while still maintaining a good correlation in the center (99.1 percent). This system can be implemented during the manufacturing of the camera or during the testing of the final product to represent 8 meters at a more manageable distance and maintaining a strong correlation to 8 meters. The single intermediate optic can be used if the center line of intermediate optic is moved and aligned with the off axis target location.

Figure 9B:
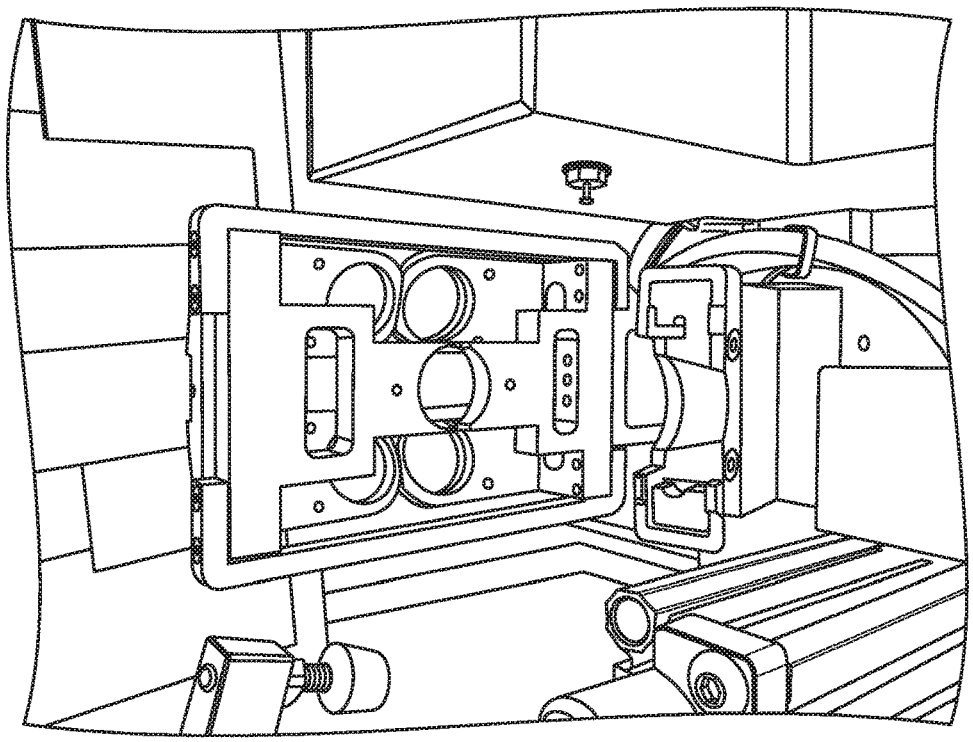
FIGS. 9A-D are perspective views of a multi-optic test structure that includes multiple optics, each one aligned with a respective region of the target.
Figure 9A:
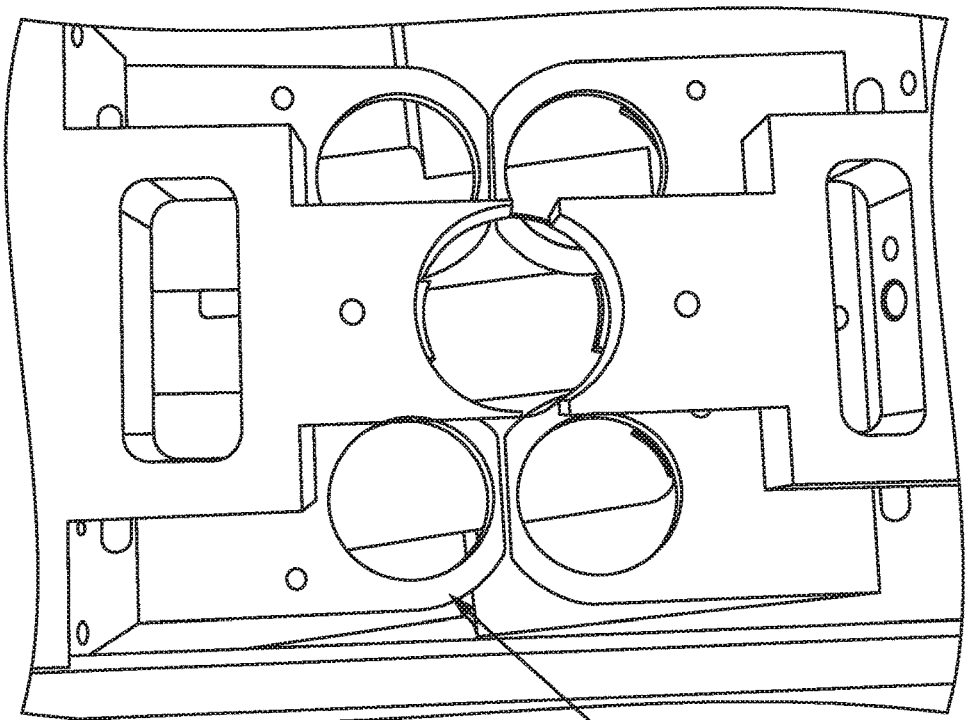
Figure 9D:
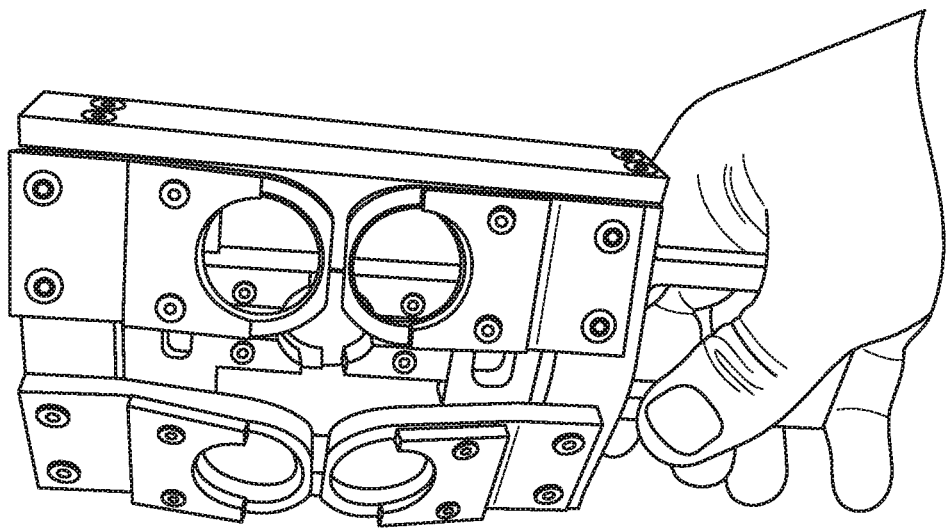
Figure 9C:
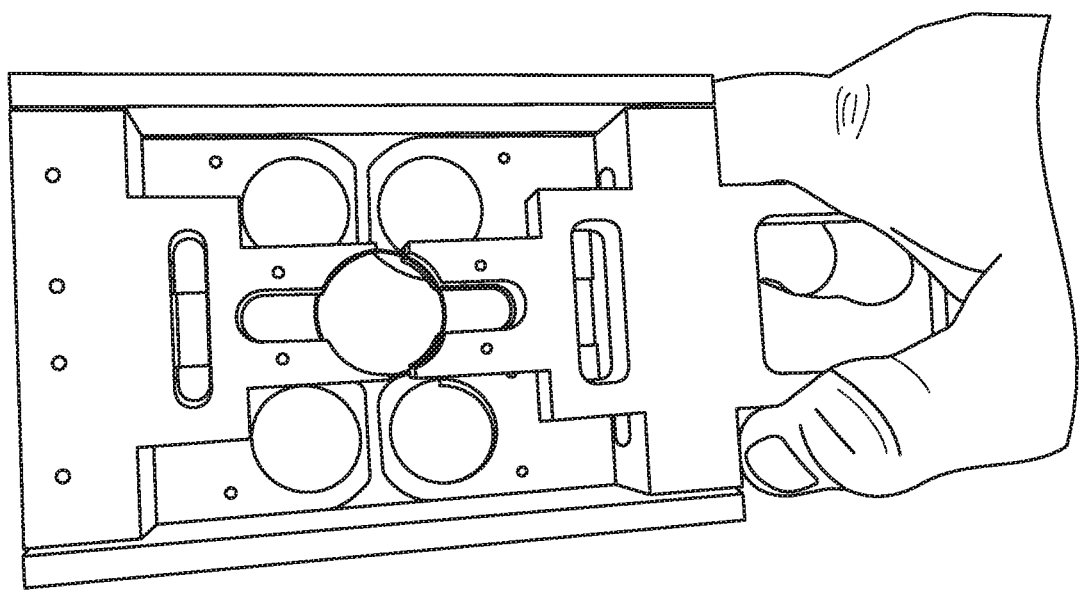
Figure 10:
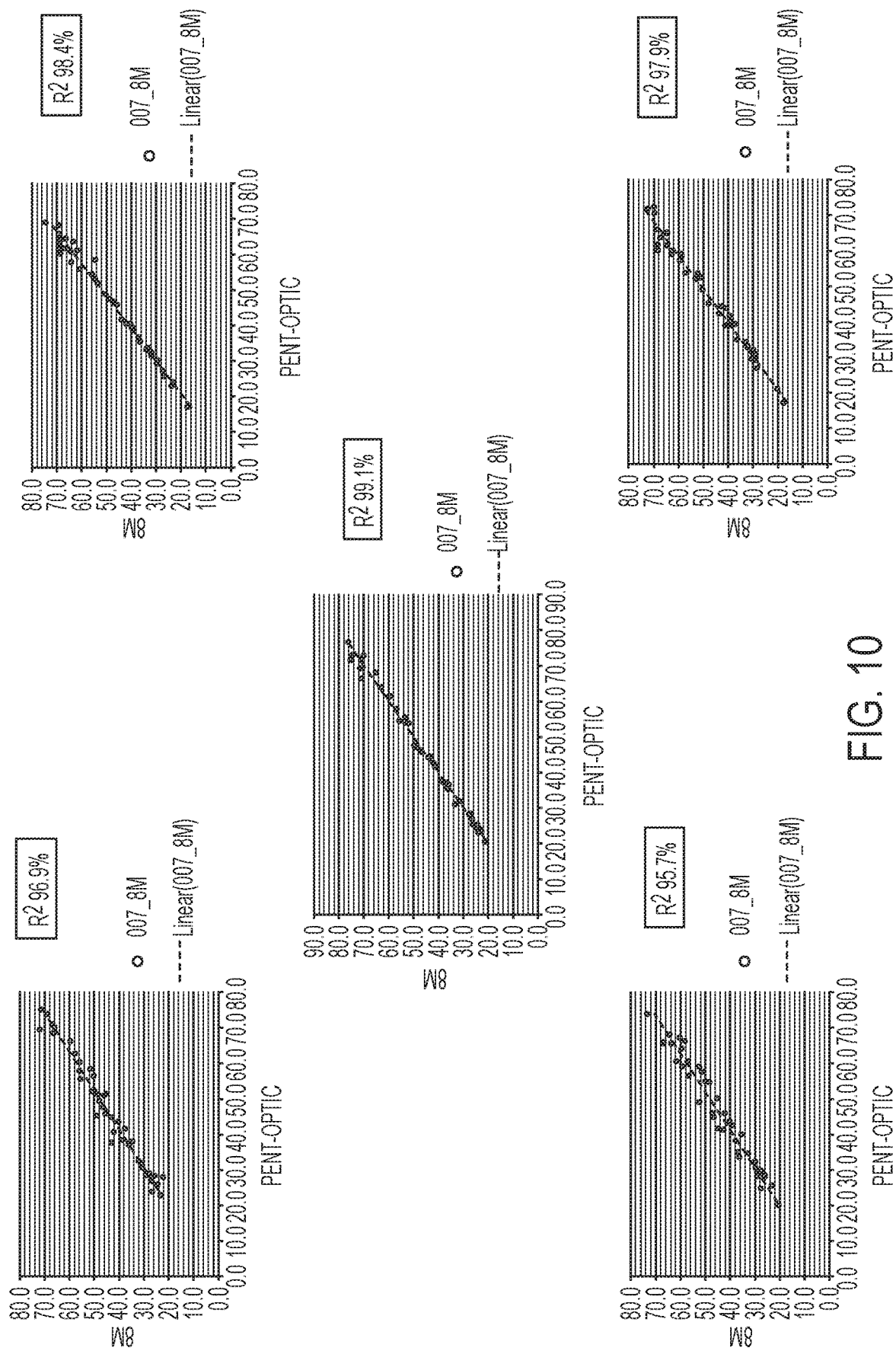
FIG. 10 shows test results using the single intermediate optic of FIGS. 9A-D.

In the illustrated embodiment, the multiple optic system includes a plurality of optics, such as five optics. The optics may have a one inch diameter and function to focus respective regions of interest (center region, upper left corner region, lower left corner region, upper right corner region, and lower right corner region), and are aligned to each respective region of interest (ROI). As can be seen with reference to FIG. 9D, the center optic may be arranged parallel to the imager of the camera and to the target, while the four outer or corner optics are angled with their axes directed toward the respective corner target regions. When disposed between the camera and the target(s), each optic may be the same distance away from the target location. FIGS. 9A and 9B show an aluminum machined sample, with five optics (one for each ROI). When used in a focus tester, the optic-to-target distance is constant (465 mm). FIGS. 9C and 9D show another five optic test structure comprising a rapid prototype sample.

Thus, the present invention provides a multi-optic test structure that is disposed between a camera being tested and a target. The multi-optic test structure supports five optics, one at a center region of the field of view of the camera and one at each corner region so that the camera captures image data of the center region and corner regions of the target through the respective optics of the multi-optic test structure. Testing using the five optic structure showed good repeatability and enhanced correlation at all five target locations or ROIs. The five optic structure is usable with a distance of less than one meter, such as less than 500 mm, such as only about 465 mm, between the camera and the target(s), which is a reduction from the typical 565 mm for current test set ups.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or U.S. Pat. No. 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A system for testing a camera for vision system for a vehicle, said system comprising:
a camera configured for use on a vehicle, the camera having a field of view;
a test structure configured to be disposed in the field of view of the camera and between the camera and a target;
wherein the test structure comprises an adjustable optic, and wherein, with the test structure disposed in the field of view of the camera and between the camera and the target, a principal axis of the adjustable optic is capable of being directed toward multiple respective regions of the target, and wherein the camera views the target via the adjustable optic;
with the test structure disposed in the field of view of the camera and between the camera and the target, the adjustable optic is adjusted to have its principal axis directed toward a center region of the target, an upper left corner region of the target, an upper right corner region of the target, a lower right corner region of the target, and a lower left corner region of the target;
with the test structure disposed in the field of view of the camera and between the camera and the target, image data is captured by the camera;
wherein image data captured by the camera comprises image data representative of (i) the center region of the target when the adjustable optic is adjusted to have its principal axis directed toward the center region of the target, (ii) the upper left corner region of the target when the adjustable optic is adjusted to have its principal axis directed toward the upper left corner region of the target, (iii) the upper right corner region of the target when the adjustable optic is adjusted to have its principal axis directed toward the upper right corner region of the target, (iv) the lower right corner region of the target when the adjustable optic is adjusted to have its principal axis directed toward the lower right corner region of the target and (v) the lower left corner region of the target when the adjustable optic is adjusted to have its principal axis directed toward the lower left corner region of the target; and
image data captured by the camera is processed to determine focus at each of the center region of the target, the upper left corner region of the target, the upper right corner region of the target, the lower right corner region of the target and the lower left corner region of the target.

2. The system of claim 1, wherein the adjustable optic, when adjusted to have its principal axis directed toward the center region of the target, has its principal axis perpendicular to an imager of the camera and perpendicular to the target.

3. The system of claim 1, wherein, with the test structure disposed in the field of view of the camera and between the camera and the target, a distance between the camera and the target is less than one meter.

4. The system of claim 3, wherein the test structure functions so that image data captured by the camera, with the test structure disposed in the field of view of the camera and between the camera and the target, is as if the distance between camera and the target is 8 meters.

5. The system of claim 4, wherein, with the test structure disposed in the field of view of the camera and between the camera and the target, a distance between the camera and the target is less than 500 mm.

6. The system of claim 4, wherein, with the test structure disposed in the field of view of the camera and between the camera and the target, a distance between the camera and the target is 465 mm.

7. A system for testing a camera for vision system for a vehicle, said system comprising:
a camera configured for use on a vehicle, the camera having a field of view;
a test structure, wherein the test structure is configured to be disposed in the field of view of the camera and between the camera and a target, and wherein, with the test structure disposed in the field of view of the camera and between the camera and the target, a distance between the camera and the target is less than one meter;
wherein the test structure comprises a plurality of optics, and wherein the plurality of optics includes a center optic, an upper left optic, an upper right optic, a lower right optic and a lower left optic;
wherein, with the test structure disposed in the field of view of the camera and between the camera and the target, each optic of the plurality of optics has its principal axis directed toward a respective region of the target, and the camera views the target via the plurality of optics;

wherein, with the test structure disposed in the field of view of the camera and between the camera and the target, the center optic has its principal axis directed toward a center region of the target, the upper left optic has its principal axis directed toward an upper left corner region of the target, the upper right optic has its principal axis directed toward an upper right corner region of the target, the lower right optic has its principal axis directed toward a lower right corner region of the target, and the lower left optic has its principal axis directed toward a lower left corner region of the target;

with the test structure disposed in the field of view of the camera and between the camera and the target, image data is captured by the camera, wherein the captured image data is representative of the regions of the target as captured via the respective optics with their principal axes directed toward the respective regions of the target; and image data captured by the camera is processed to determine focus at each of the center region of the target, the upper left corner region of the target, the upper right corner region of the target, the lower right corner region of the target and the lower left corner region of the target.

8. The system of claim 7, wherein the test structure functions so that image data captured by the camera, with the test structure disposed in the field of view of the camera and between the camera and the target, is as if the distance between camera and the target is 8 meters.

9. The system of claim 7, wherein the center optic has its principal axis perpendicular to an imager of the camera and perpendicular to the target.

10. The system of claim 7, wherein each of the upper left optic, lower left optic, upper right optic and lower right corner optic is angled so that its respective principal axis is directed toward a respective corner region of the target.

11. A system for testing a camera for vision system for a vehicle, said system comprising:

a camera configured for use on a vehicle, the camera having a field of view;

a test structure, wherein the test structure is configured to be disposed in the field of view of the camera and between the camera and a target, wherein, with the test structure disposed in the field of view of the camera and between the camera and the target, a distance between the camera and the target is less than one meter;

wherein the test structure comprises an adjustable optic that is adjustable to direct its principal axis toward multiple regions of the target, and the camera views the target via the adjustable optic;

with the test structure disposed in the field of view of the camera and between the camera and the target, adjusting the adjustable optic is adjusted to direct its principal axis toward multiple regions of the target;

wherein the adjustable optic is adjusted to have its principal axis directed toward a center region of the target, an upper left corner region of the target, an upper right corner region of the target, a lower right corner region of the target, and a lower left corner region of the target;

with the test structure disposed in the field of view of the camera and between the camera and the target, multiple frames of image data are captured by the camera;

wherein the captured multiple frames of image data comprise (i) a captured frame of image data representative of the center region of the target when the adjustable optic is adjusted to have its principal axis directed toward the center region of the target, (ii) a captured frame of image data representative of the upper left corner region of the target when the adjustable optic is adjusted to have its principal axis directed toward the upper left corner region of the target, (iii) a captured frame of image data representative of the upper right corner region of the target when the adjustable optic is adjusted to have its principal axis directed toward the upper right corner region of the target, (iv) a captured frame of image data representative of the lower right corner region of the target when the adjustable optic is adjusted to have its principal axis directed toward the lower right corner region of the target and (v) a captured frame of image data representative of the lower left corner region of the target when the adjustable optic is adjusted to have its principal axis directed toward the lower left corner region of the target; and frames of image data captured by the camera are processed to determine focus at each of the multiple regions of the target.

12. The system of claim 11, wherein the test structure functions so that image data captured by the camera, with the test structure disposed in the field of view of the camera and between the camera and the target, is as if the distance between camera and the target is 8 meters.

13. The system of claim 11, wherein, with the test structure disposed in the field of view of the camera and between the camera and the target, a distance between the camera and the target is less than 500 mm.

14. The system of claim 11, wherein the adjustable optic, when adjusted to have its principal axis directed toward the center region of the target, has its principal axis perpendicular to an imager of the camera and perpendicular to the target.

* * * * *

UNITED STATES PATENT AND TRADEMARK OFFICE
CERTIFICATE OF CORRECTION

PATENT NO. : 10,635,914 B2
APPLICATION NO. : 16/014590
DATED : April 28, 2020
INVENTOR(S) : Matthew C. Sesti et al.

Page 1 of 1

It is certified that error appears in the above-identified patent and that said Letters Patent is hereby corrected as shown below:

In the Claims

<u>Column 8</u>
Claim 11, Lines 4-5, "adjusting the adjustable optic is adjusted" should be --the adjustable optic is adjusted--

Signed and Sealed this
Ninth Day of June, 2020

Andrei Iancu
*Director of the United States Patent and Trademark Office*